United States Patent
Byun et al.

(10) Patent No.: US 7,133,447 B2
(45) Date of Patent: Nov. 7, 2006

(54) MOTION ESTIMATION METHOD USING ADAPTIVE MODE DECISION

(75) Inventors: Hyun Il Byun, Seoul (KR); Doo Young Yi, Seoul (KR)

(73) Assignee: C& S Technology Co., Ltd., Seoul (KR)

( * ) Notice: Subject to any disclaimer, the term of this patent is extended or adjusted under 35 U.S.C. 154(b) by 1 day.

(21) Appl. No.: 11/138,036

(22) Filed: May 26, 2005

(65) Prior Publication Data

US 2006/0098740 A1    May 11, 2006

(30) Foreign Application Priority Data

Nov. 9, 2004    (KR)    ............... 10-2004-0091077

(51) Int. Cl.
H04N 7/12    (2006.01)

(52) U.S. Cl. ............. 375/240; 375/240.01; 375/240.12

(58) Field of Classification Search ................. 375/240, 375/240.01, 240.12
See application file for complete search history.

(56) References Cited

U.S. PATENT DOCUMENTS 6,148,027 A * 11/2000 Song et al. ................. 375/240

FOREIGN PATENT DOCUMENTS

KR    2001-0082934    8/2001

* cited by examiner

*Primary Examiner*—Allen Wong
(74) *Attorney, Agent, or Firm*—Harness, Dickey & Pierce, PLC

(57) ABSTRACT

A motion estimation method using adaptive mode decision is disclosed. The method includes a motion vector difference value calculation step of calculating a motion vector difference value using an input motion vector estimation value x component for a current block and an input x offset corresponding to a current SAD. At the MVD Variable Length Coding (VLC) step, the length of a bit string, which is obtained by performing variable-length coding on an MVDx, is calculated. At a motion vector difference value calculation step, a motion vector difference value is calculated using an input motion vector estimation value y component for a current block and an input y offset corresponding to the current SAD. At an MVD VLC step, the length of a bit string, which is obtained by performing variable-length coding on an MVDy, is calculated. Thereafter, the amount of motion vector coding is produced by adding the MVDx and the MVDy. The amount of texture coding of a current block or a macro block is estimated using SAD values and quantization coefficients of previous macro blocks. A SAD correction coefficient is produced using the amount of motion vector coding and the texture vector coding amount. Finally, the SAD values are multiplied by the SAD correction coefficient, thus correcting the SAD values.

2 Claims, 4 Drawing Sheets

- PRIOR ART -

- PRIOR ART -

MOTION ESTIMATION METHOD USING ADAPTIVE MODE DECISION

BACKGROUND OF THE INVENTION

1. Field of the Invention

The present invention relates generally to a motion estimation method using adaptive mode decision and, more particularly, to a method of estimating motion by considering quantization coefficients, the amount of motion vector coding and the amount of texture coding as well as Sum of Absolute Difference values when deciding between inter 1 motion vector mode and inter 4 motion vector mode.

2. Description of the Related Art

In a conventional motion estimation method, when deciding between inter 1 Motion Vector (1MV) mode and inter 4 Motion Vector (4MV) mode, only a Sum of Absolute Difference (SAD) value corresponding to a difference value between a current frame block and a previous frame block is considered with a fixed weight being assigned to the inter 1MV mode. As a result, if there is a relatively large amount of motion at a low bit rate, the inter 4MV mode is decided on. In this case, there occurs a counter result in which the total amount of coding increases because the increase in the amount of motion vector coding is significantly greater than the decrease in the amount of texture coding. In the inter 4MV mode, a relatively large number of motion vectors are generated compared to the inter 1MV mode, so that the decrease in the amount of texture coding is large at a high bit rate. Thus, although the amount of motion vector coding increases, the amount of coding is expected to decrease as a whole. If a quantization coefficient is large (i.e., the decrease in the amount of texture coding is small) or there is a large amount of motion (i.e., the increase in the motion vector is large), there is a problem in that the inter 4MV mode causes a larger amount of coding than the inter 1MV mode.

For example, although Korean Unexamined Pat. Publication No. 2001-0082934 considers the amount of motion vector coding, the consideration is not direct, unlike the present invention. Further, this patent publication attempts to reduce the length of a motion vector difference value in such a way as to select zero vector median predictors when they are smaller than a predetermined threshold. Furthermore, Korean Unexamined Pat. Publication No. 2004-0008360 considers the coding of a motion vector. However, this patent publication considers only the coding length of a motion vector, but does not deal with the amount of texture coding.

The construction and effect of the prior art are described in detail with reference to the accompanying drawings.

FIG. 1 illustrates a process of coding a macro block image (an image processing unit having a 16×16 size) in the conventional Moving Picture Experts Group (MPEG)-4 standard.

Motion Estimation (ME) 10 is the step of finding a motion by comparing the luminous component of a previous frame and the luminous component of a current frame. In this step, the value of a motion vector, indicating the degree of movement from the previous frame, is obtained on a macro block or block (an image processing unit having an 8×8 size) basis. The following steps 11 to 16 are performed on a block basis, and are referred to as texture coding. Texture coding is performed on each of four luminance blocks and two chrominance blocks that are included in one macro block. Motion Compensation minus (MC(−)) 11 is the step of subtracting the pixel value of a previous frame from the pixel value of a current block using the motion vector obtained at the step of ME 10. With this step, only the pixel difference between the previous and current frames remains, and the amount of information to be coded is reduced accordingly. At the step of Discrete Cosine Transform/Quantization (DCT/Q) 12, spatial domain data, having undergone MC(−) 11, are transformed into frequency domain data, and quantization is performed to reduce the amount of information. Alternating Current/Direct Current (AC/DC) Prediction (ADP) 13 is performed only in an intra macro block, and obtains the difference value between the AC/DC coefficients of neighboring blocks. This step has the effect of reducing the amount of coding by reducing spatial redundancy. Variable Length Coding (VLC) 14 is the step of performing variable-length coding on data and generating a final bit stream. Inverse Q/Inverse DCT (IQ/IDCT) 15 and Motion Compensation plus (MC(+)) 16 are the steps of restoring a block image by performing the processes 12 and 11 in an inverse manner, in which case data to be used in a decoder are output as a result of the IQ/IDCT 15 and the MC(+) 16. Since the data are used in the ME 10 of the next frame, the decoder and the encoder can estimate and compensate for motion using the same screen.

FIG. 2 is a flowchart illustrating the steps of a conventional motion estimation method. Macro block-based ME 20 is the step of calculating the SAD values of motion vectors x,y within a motion search range and finding a motion vector having a minimal SAD value. The SAD is defined as the following Equation 1:

$$SAD(x, y) = \sum_{i=0}^{15} \sum_{j=0}^{15} |C_{i,j} - P_{i+x,j+y}| \qquad (1)$$

where $C_{i,j}$ is the pixel value of a current frame, and $P_{i,j}$ is the pixel value of a previous frame. It is assumed that the minimal of SAD values output from the macro block-based ME 20 is $SAD_{i16}$. Block-based ME 21 is performed within a range of −2 to +2 around the motion vector that is obtained in macro block-based ME 20 on a block basis. In this case, the SAD is defined as the following Equation 2:

$$SAD(x, y) = \sum_{i=0}^{7} \sum_{j=0}^{7} |C_{i,j} - P_{i+x,j+y}|, \text{ or} \qquad (2)$$

$$mrSAD(x, y) = \sum_{i=0}^{7} \sum_{j=0}^{7} |(C_{i,j} - m_c) - (P_{i+x,j+y} - m_p)|$$

$$m_c = \frac{1}{64} \sum_{i=0}^{7} \sum_{j=0}^{7} C_{i,j}, \quad m_p = \frac{1}{64} \sum_{i=0}^{7} \sum_{j=0}^{7} P_{i+x,j+y}$$

Block-based ME 21 is performed on each of four luminance blocks within a macro block. It is assumed that the minimal of SAD values for respective blocks is $SAD_{i8\_k}$ (k=0, 1, 2, 3). In intra parameter calculation 22, a parameter for determining whether a current macro block will be coded into an intra macro block or an inter macro block is calculated using the following Equations 3 and 4:

$$\text{MB\_mean} = \left( \sum_{i=0, j=0}^{15,15} C_{i,j} \right) \bigg/ 256 \qquad (3)$$

$$A = \sum_{i=0, j=0}^{15,15} |C_{i,j} - \text{MB\_mean}| \qquad (4)$$

At step 23, it is determined whether the current macro block will be coded into an intra macro block or an inter macro block using the parameter, and $SAD_{i16}$ and $SAD_{i8\_k}$ obtained at the steps of the macro block unit ME 20 and the block unit ME 21. When the Equation 5 is true, a condition in which the current macro block will be coded into the intra macro block is fulfilled. The reason why 512 is subtracted from the right side of Equation 5 is that the inter mode, requiring a smaller amount of coding than the intra mode, is generally preferred. The $SAD_{inter}$ of Equation 5 is defined by Equation 6. In Equation 6, Min( ) refers to the smaller of the two numbers in parentheses.

$$A < (SAD_{inter} - 512) \qquad (5)$$

$$SAD_{inter} = \text{Min}\left( SAD_{i16}, \sum_{k=0}^{3} SAD_{i8\_k} \right) \qquad (6)$$

If the current macro block will be coded into the intra macro block, the motion vector is set to 0 and the step of ME is terminated at step 27. In the case of the inter macro block, the process proceeds to the step of macro block-based semi-pixel ME. Macro block-based semi-pixel ME 24 is the step of calculating the SAD values of the eight semi-pixel motion vectors, including upper, lower, right, left and diagonal semi-pixel motion vectors, of the motion vector obtained from the macro block-based ME 20, and finding a motion vector that has a minimal SAD value. A pixel value at the position of a semi-pixel is replaced with the average value of surrounding integer pixel values. It is assumed that the minimal of the SAD values obtained in the macro block-based semi-pixel ME 24 is $SAD_{h16}$. Block-based semi-pixel ME 25 is the step of calculating SAD values for the eight semi-pixel motion vectors, including upper, lower, right, left and diagonal semi-pixel motion vectors, of the motion vector obtained from the block-based ME 21, and finding a motion vector that has a minimal SAD value. A pixel value at the position of a semi-pixel is replaced with the average value of surrounding integer pixel values. The semi-pixel ME 25 of the block unit is performed on each of four luminance blocks within the macro block. It is assumed that the minimal of SAD values for respective blocks is $SAD_{h8\_k}$ (k=0, 1, 2, 3). At the step of motion vector decision 26, whether a macro block-based motion vector, an inter 1MV mode block-based motion vector, or an inter 4MV mode block-based motion vector is used is determined using Equation 7. If Equation 7 is true, the block-based motion vector is used. If Equation 7 is false, the macro block-based motion vector is used. The reason why 128 is subtracted from the right side of Equation 7 is that the use of the macro block-based motion vector is preferred (because the amount of motion vector coding is generally smaller). In Equation 7, $SAD_{16}$ and $SAD_{8\_k}$ are defined by Equations 8 and 9, respectively. In Equations 8 and 9, Min( ) refers to the smaller of the two numbers in parentheses.

$$\sum_{k=0}^{3} SAD_{8\_k} < SAD_{16} - 128 \qquad (7)$$

$$SAD_{16} = \text{Min}(SAD_{i16}, SAD_{k16}) \qquad (8)$$

$$SAD_{8\_k} = \text{Min}(SAD_{i8\_k}, SAD_{k8\_k}) \qquad (9)$$

SUMMARY OF THE INVENTION

Accordingly, the present invention has been made keeping in mind the above problems occurring in the prior art, and an object of the present invention is to minimize the total amount of coding regardless of bit rate or the amount of motion by considering a quantization coefficient, the amount of motion vector coding and the amount of texture coding as well as a SAD value when deciding between inter 1MV mode and inter 4MV mode.

In order to accomplish the above object, the present invention provides a motion estimation method using adaptive mode decision to remove temporal redundancy in moving picture compression, including a motion vector difference value calculation step of calculating a motion vector difference value using an input motion vector estimation value x component for a current block and an input x offset corresponding to a current SAD, and outputting a Motion Vector Difference x (MVDx) as a result of the calculation; an MVD Variable Length Coding (VLC) step of calculating the length of a bit string that is obtained by performing variable-length coding on the MVDx, and outputting an MVDx coding length as a result of the calculation; a motion vector difference value calculation step of calculating a motion vector difference value using an input motion vector estimation value y component for a current block and an input y offset corresponding to the current SAD, and outputting a Motion Vector Difference y (MVDy) as a result of the calculation; an MVD VLC step of calculating the length of a bit string that is obtained by performing variable-length coding on the MVDy, and outputting an MVDy coding length as a result of the calculation; a step of producing the amount of motion vector coding by adding the MVDx and the MVDy; a step of estimating the amount of texture coding of a current block or a macro block using SAD values and quantization coefficients of previous macro blocks; a step of producing a SAD correction coefficient using the amount of motion vector coding and the texture vector coding amount; and a step of multiplying the SAD values by the SAD correction coefficient; wherein the SAD values are corrected.

Preferably, in the motion estimation method, the generation of the SAD value is performed by controlling weight, which prefers macro block-based motion estimation, using the amount of motion vector coding and the amount of texture vector coding; wherein a motion vector, in which a sum of the amount of texture coding and the amount of the motion vector coding, is minimized is found.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The construction and operation of embodiments of the present invention are described in detail with reference to the accompanying drawings.

Figure 1:
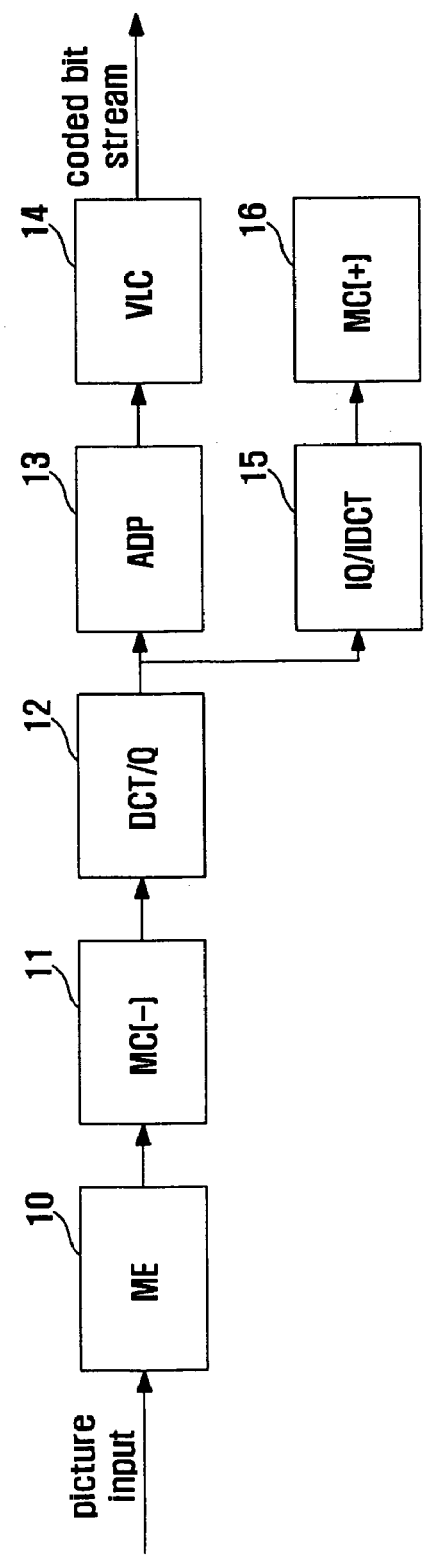
FIG. 1 is a block diagram illustrating a process of coding a macro block image (an image processing unit having a 16×16 size) in the conventional Moving Picture Experts Group (MPEG)-4 standard.
Figure 2:
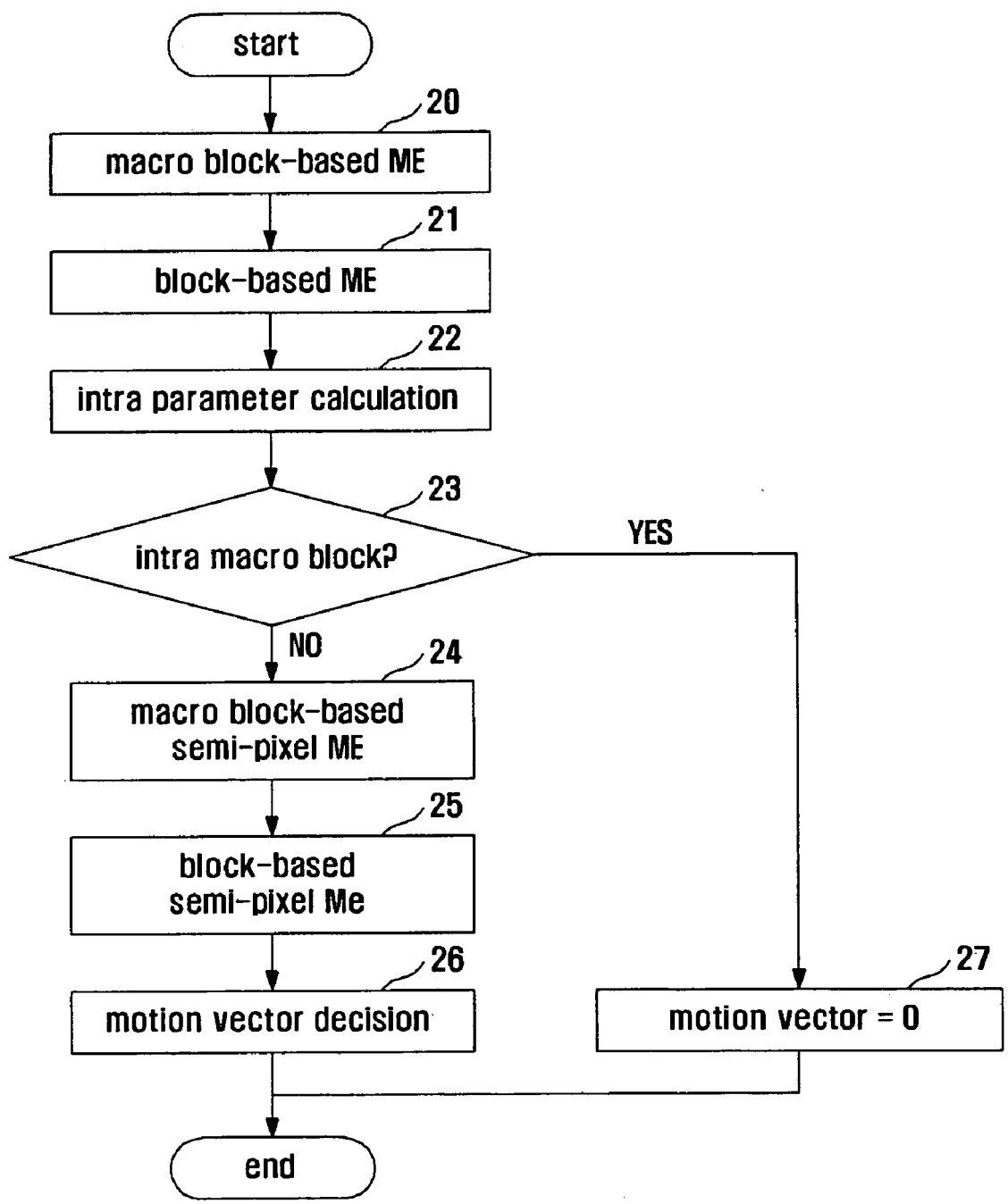
FIG. 2 is a flowchart illustrating the steps of a conventional motion estimation method.
Figure 3:
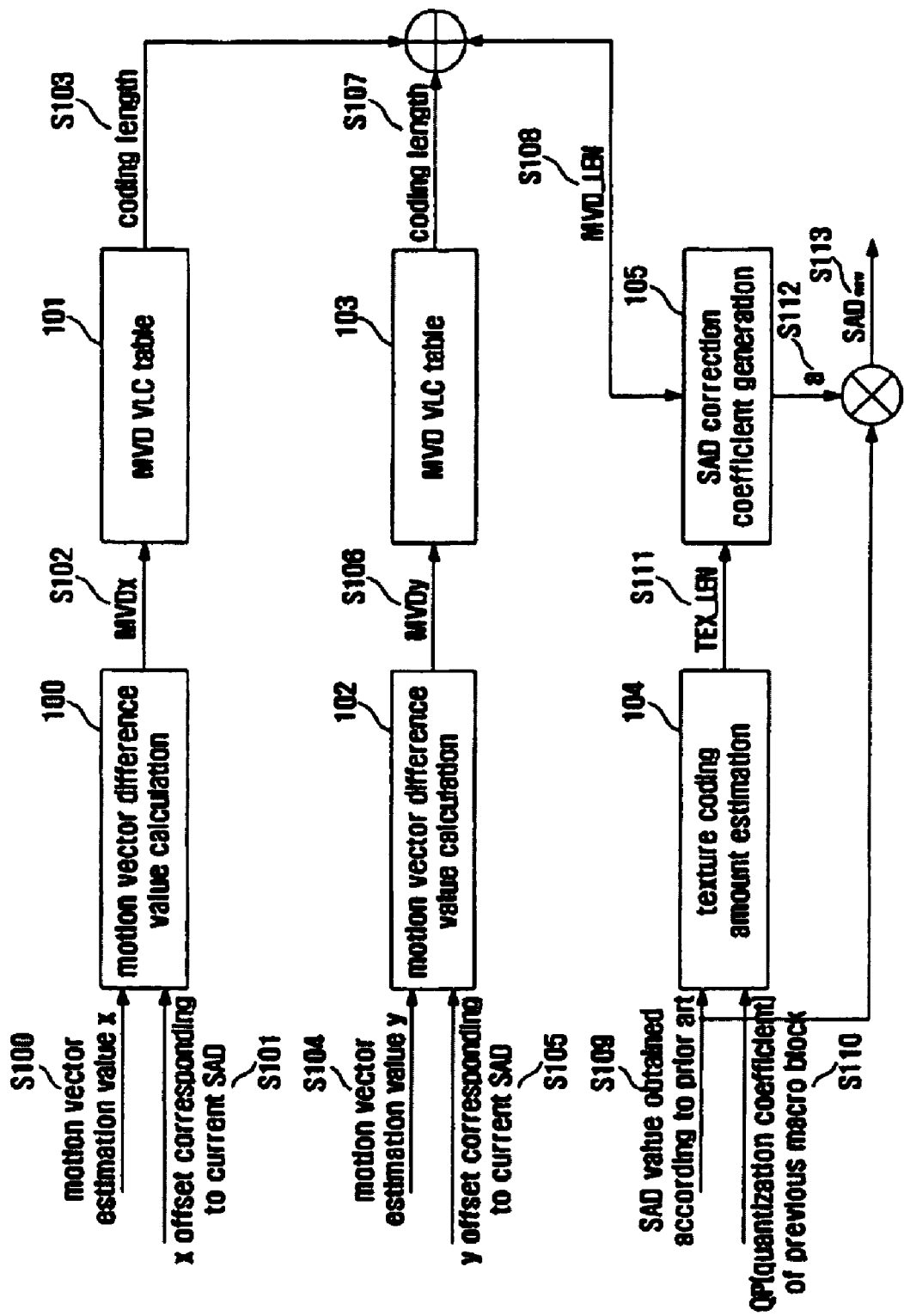
FIG. 3 is a diagram illustrating the SAD correction method of a motion estimation method according to the present invention.

FIG. 3 shows the SAD correction method of a motion estimation method according to the present invention. In the present invention, the SAD correction method is applied to all SAD values obtained within a motion estimation range so as to estimate motion in the prior art. In more detail, the SAD correction method is applied to the results of Equations 1 and 2 that have been described above in conjunction with the prior art, new SAD values are produced, and motion estimation is then performed based on the new SAD values. In this case, the SAD correction method may be applied to the results of Equations 10 and 11 instead the results of Equations 1 and 2, the difference between a value obtained by subtracting an average value from data on a current frame and a value obtained by subtracting the average from data on a previous frame is obtained, and motion estimation may then be performed as described above.

$$mrSAD(x, y) = \sum_{i=0}^{15} \sum_{j=0}^{15} |(C_{i,j} - m_c) - (P_{i+x,j+y} - m_p)| \quad (10)$$

$$m_c = \frac{1}{256} \sum_{i=0}^{15} \sum_{j=0}^{15} C_{i,j}, \quad m_p = \frac{1}{256} \sum_{i=0}^{15} \sum_{j=0}^{15} P_{i+x,j+y}$$

$$mrSAD(x, y) = \sum_{i=0}^{7} \sum_{j=0}^{7} |(C_{i,j} - m_c) - (P_{i+x,j+y} - m_p)| \quad (11)$$

$$m_c = \frac{1}{64} \sum_{i=0}^{7} \sum_{j=0}^{7} C_{i,j}, \quad m_p = \frac{1}{64} \sum_{i=0}^{7} \sum_{j=0}^{7} P_{i+x,j+y}$$

Further, the SAD correction method can be applied to all SAD values that are obtained at the steps of the macro block unit semi-pixel Motion Estimation (ME) 24 and the block unit semi-pixel ME 25 in the prior art. At the step of motion vector difference value calculation 100, a motion vector difference value is calculated using an input motion vector estimation value x component S100 and an input x offset S101 corresponding to a current SAD, and a Motion Vector Difference x (MVDx) S102 is output as a calculation result. The motion vector estimation value x component S100 is the same as an estimation value that is used to code and output a motion vector in standards such as H.263 and MPEG-4. That is, it is the intermediate value of the motion vectors of blocks existing in left, upper and right upper (west, north and northeast) directions on the basis of a block or macro block on which current motion estimation is performed. In an MVD VLC table 101, the length of a bit string obtained by performing variable-length coding on the MVDx S102 is calculated, and an MVDx coding length S103 is output as a calculation result. This length represents the length of the bit string of the motion vector that is actually transmitted. At the step of motion vector difference value calculation 102, a motion vector difference value is calculated using an input motion vector estimation value y component S104 and an input y offset S105 corresponding to a current SAD, and Motion Vector Difference y (MVDy) S106 is output as a calculation result. The motion vector estimation value y component S104 is the same as an estimation value that is used to code and output a motion vector in standards such as H.263 and MPEG-4. That is, it is the intermediate value of the motion vectors of blocks existing in left, upper and right upper (west, north, and northeast) directions on the basis of a block or macro block on which current motion estimation is performed. In an MVD VLC table 103, the length of a bit string obtained by performing variable-length coding on the MVDy S106 is calculated, and an MVDy coding length S107 is output as a calculation result. This length represents the length of the bit string of the motion vector that is actually transmitted.

The MVD VLC tables 101 and 103 perform the same operation. MVD_LEN S108 is a value obtained by adding the MVDx coding length S103 and the MVDy coding length S107, and refers to the total amount of motion vector coding of a current macro block or block. At the step of texture coding amount estimation 104, the amount of texture coding of a current block or macro block is estimated using the SAD value S109, which is obtained according to the prior art, and the quantization coefficient S110 of a previous macro block. TEX_LEN S111 is the estimated amount of texture coding. At the step of SAD correction coefficient generation 105, a SAD correction coefficient is generated using the TEX_LEN S111 and the MVD_LEN S108. "a" S112 is a SAD correction coefficient obtained as a result of the SAD correction coefficient generation 105, and is always higher than or equal to 1. The SAD correction coefficient "a" S112 according to the present invention is calculated by the following Equation 12.

$$a = 1 + \frac{MVD\_LEN}{TEX\_LEN} \quad (12)$$

$SAD_{new}$ S113 is a final SAD value, and is a value obtained by multiplying the SAD value S109, which is obtained according to the prior art, by the SAD correction coefficient "a" S112. At the step of the motion estimation according to the present invention, $SAD_{new}$ S113 is used instead of the SAD value S109 that is obtained according to the prior art.

Figure 4:
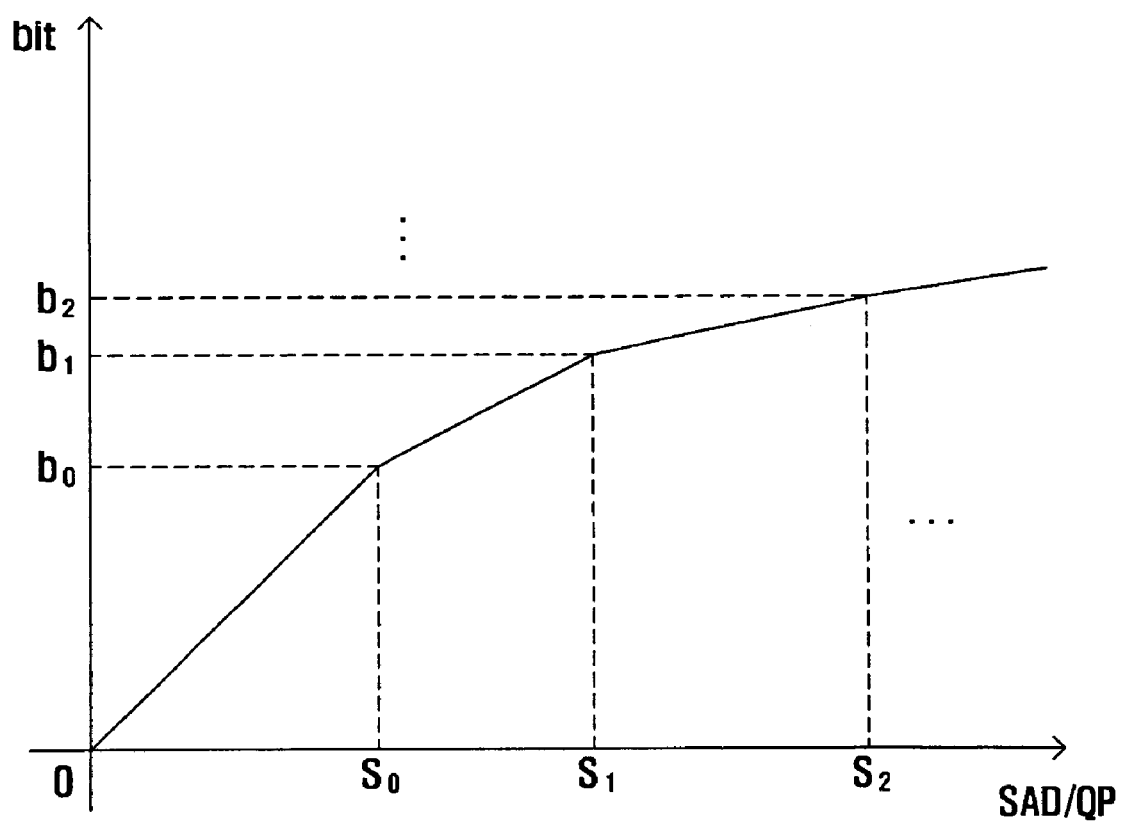
FIG. 4 shows a model that estimates the amount of texture coding using an input value according to the present invention.

FIG. 4 shows a model that estimates the amount of texture coding using an input value according to the present invention. If the SAD and the QP (Quantization Parameter) are given, the amount of coding of a block or a macro block that can be obtained is not a specific value, but is distributed over a specific range. In order to precisely determine the amount of texture coding, discrete cosine transformation and quantization must be performed. Performing discrete cosine transformation and quantization on all the vectors within a motion estimation range requires a large amount of calculation. Accordingly, in the present invention, the amount of texture coding is estimated by linearly approximating the correlation between a SAD/QP value and the amount of texture coding on a section basis. The amount of texture coding TEX_LEN is estimated based on the SAD/QP value using Equation 13. In FIG. 4, the number of sections, and section boundary values, including $s_0$, $s_1$, $s_2$, $b_0$, $b_1$ and $b_2$, can be determined experimentally.

$$TEX\_LEN = \begin{cases} \frac{b_0}{s_0}\frac{SAD}{QP} & (0 \leq SAD/QP < s_0) \\ \frac{b_1 - b_0}{s_1 - s_0}\left(\frac{SAD}{QP} - s_0\right) + b_0 & (s_0 \leq SAD/QP < s_1) \\ \frac{b_2 - b_1}{s_2 - s_1}\left(\frac{SAD}{QP} - s_1\right) + b_1 & (s_1 \leq SAD/QP < s_2) \\ L \end{cases} \quad (13)$$

As described above, the motion estimation method using adaptive mode decision in accordance with the present invention minimizes the total amount of coding regardless of bit rate or the amount of motion by considering a quantization coefficient, the amount of motion vector coding and the amount of texture coding as well as a SAD value when deciding between inter 1MV mode and inter 4MV mode.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A motion estimation method using adaptive mode decision to remove temporal redundancy in moving picture compression, comprising:

a motion vector difference value calculation step of calculating a motion vector difference value using an input motion vector estimation value x component for a current block and an input x offset corresponding to a current Sum of Absolute Difference (SAD), and outputting a Motion Vector Difference x (MVDx) as a result of the calculation;

an MVD Variable Length Coding (VLC) step of calculating a length of a bit string that is obtained by performing variable-length coding on the MVDx, and outputting an MVDx coding length as a result of the calculation;

a motion vector difference value calculation step of calculating a motion vector difference value using an input motion vector estimation value y component for a current block and an input y offset corresponding to the current SAD, and outputting a Motion Vector Difference y (MVDy) as a result of the calculation;

an MVD VLC step of calculating the length of a bit string that is obtained by performing variable-length coding on the MVDy, and outputting an MVDy coding length as a result of the calculation;

a step of producing an amount of motion vector coding by adding the MVDx and the MVDy;

a step of estimating an amount of texture coding of a current block or a macro block using SAD values and quantization coefficients of previous macro blocks;

a step of producing a SAD correction coefficient using the amount of motion vector coding and the texture vector coding amount; and a step of multiplying the SAD values by the SAD correction coefficient;

wherein the SAD values are corrected.

2. The motion estimation method set forth in claim 1, wherein the generation of the SAD value is performed by controlling weight, which prefers macro block-based motion estimation, using the amount of motion vector coding and the amount of texture vector coding;

wherein a motion vector, in which a sum of the amount of texture coding and the amount of the motion vector coding, is minimized is found.

* * * * *